June 17, 1924.  
V. P. RUMELY  
BOLT WASHER  
Filed Aug. 28, 1922
1,497,882
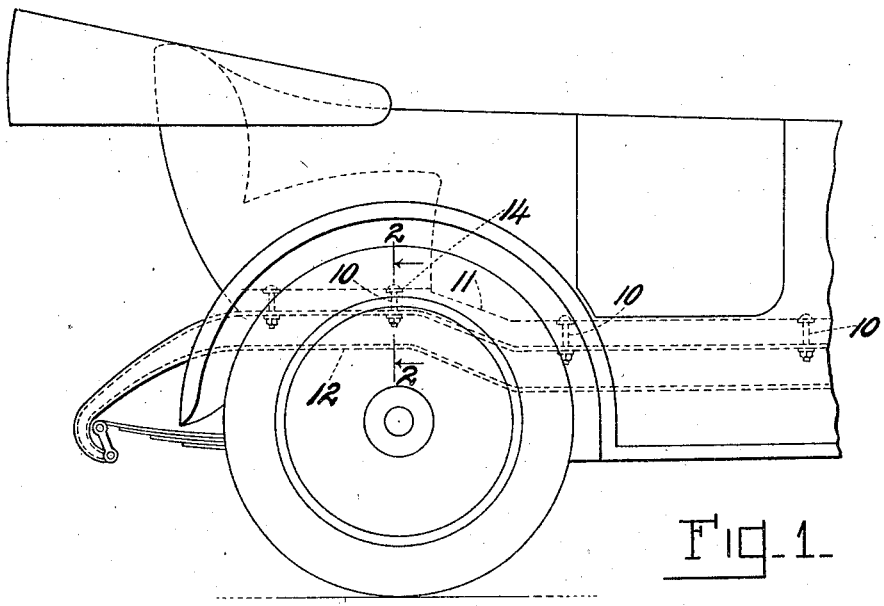
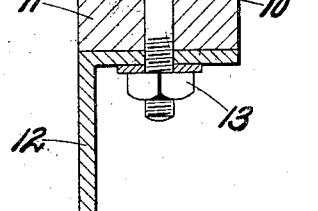
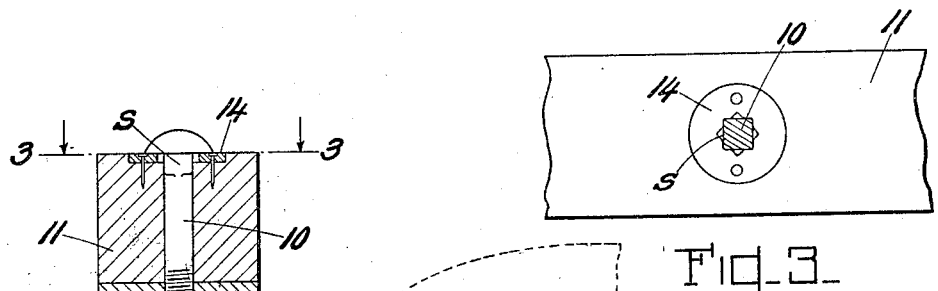
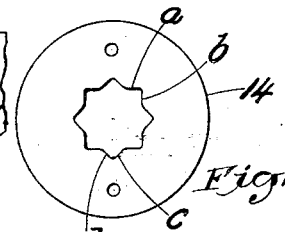
INVENTOR  
Vincent P. Rumely  
by Macleod, Calver, Copeland & Dike  
Attys.

Patented June 17, 1924.

1,497,882

UNITED STATES PATENT OFFICE.

VINCENT P. RUMELY, OF DETROIT, MICHIGAN.

BOLT WASHER.

Application filed August 28, 1922. Serial No. 584,611.

*To all whom it may concern:*

Be it known that I, VINCENT P. RUMELY, a citizen of the United States, residing at Detroit, county of Wayne, State of Michigan, have invented a certain new and useful Improvement in Bolt Washers, of which the following is a specification, reference being had therein to the accompanying drawings.

My invention has for its object a new and improved body bolt washer such as is used in the manufacture of automobiles and other similar articles in which there are a pair of members each containing holes to be aligned with holes in the other member. As is known to those skilled in the art, it is customary in the manufacture of automobiles to place on the upper side of the sill or wooden frame member of the body, a washer which is fastened in place usually by nails or tacks, which washer receives the squared shank of the body bolt by means of which the body is secured to the chassis frame. These washers prevent the bolt turning, so that the nuts on the underside can be taken up without the workman holding the head with a wrench, screw driver or other tool. They also distribute the strain imposed on the body frame by the bolt. Heretofore difficulty has been experienced because the squared shank of the bolt would not always enter the squared hole in the washer, and it was necessary for the workman to turn the bolt a little and tap it with a hammer, repeating this operation until the bolt entered the hole. As these washers and bolts are located frequently in inaccessible places, and where the washer cannot be seen easily so that the work had to be done by feeling, much time was wasted in inserting the bolts. The washer embodying my invention, though costing no more than washers as heretofore constructed, completely obviates this difficulty, and saves much time in assembling automobiles.

The invention will be fully understood from the following description when taken in connection with the accompanying drawings, and the novel features thereof will be pointed out and clearly defined in the claims at the close of this specification. In the accompanying drawings the invention is shown as applied to an automobile but I do not limit myself to its use in this connection.

In the drawings, Fig. 1 is a side view of an automobile partly broken away showing in elevation some of the body bolts and washers embodying my invention.

Fig. 2 is a section taken on line 2—2 of Fig. 1.

Fig. 3 is a section taken on line 3—3 of Fig. 2.

Fig. 4 is a plan view of a washer embodying my invention.

Fig. 5, is a fragmentary detail perspective view illustrating the cooperation of the parts in positioning the bolt.

The body bolt is designated 10, the sill member of the body 11, the frame of the chassis 12, the nut of the body bolt 13, and the body bolt washer 14. The bolts 10 have a square or prismatic shank as indicated at S and are inserted with the screw-threaded end down and the head up. The washer embodying my invention (see Fig. 4) has a central opening to receive the prismatic shank of the bolt. This opening is star-shaped, the star for a square bolt having 8 points, and the adjacent sides of each of the points being at an angle of 90° to each other; thus the side $a$ is at 90° with the side $b$ and the side $c$ at 90° with the side $d$. This construction is such that it will receive the squared shank of the bolt in positions which are 45° apart instead of 90°. When the cylindrical portion of the body bolt is inserted through the hole and the lower portion of the squared shank contacts with the upper face of the washer, the bolt tends to rotate on its own axis slightly, owing to the inclined surfaces $e$ between the shank and cylindrical portion of the bolt and also owing to the fact that in punching the washer the inwardly extending points forming the star are rounded off somewhat, as shown at $f$ in Fig. 5. In practice it is found that with this construction the bolt can be dropped into place and then struck a blow with the hammer and the shank will then find its way into the star shaped opening, either rotating slightly or bending the points of the washer aside enough to permit the shank to enter the hole. When the bolt is driven home into the washer the washer is just as effective as those heretofore employed and the saving of time is very great. In the foregoing explanation, I have described my invention as embodied in a bolt having a square shank and a washer having a hole which is an eight-pointed star. It will be understood however that this is not essential since the same results will be obtained if the shank is prismatic and the star shaped hole has twice as many points as there are sides to the prism.

What I claim is:—

1. In combination, a bolt having a prismatic shank, and a washer having a hole therethrough which is star-shaped, the number of points of the star being twice the number of sides of the prismatic shank of the bolt, and said bolt and washer having portions tending relatively to rotate each other when relatively moved in the direction of the axis of said bolt.

2. In combination with a squared shank of the bolt, a washer having a central hole which is in the shape of an eight-pointed star, said bolt and washer having inclined portions cooperating to relatively rotate said parts when relatively moved in an axial direction.

3. In combination with a bolt having a squared shank and a curved surface adjacent said shank, of a washer the central hole of which is an eight-pointed star, the adjacent sides of the points of the star being at 90° to each other, and the inwardly extending points of said washer being curved to cooperate with the curved surface of said bolt.

In testimony whereof I affix my signature.

VINCENT P. RUMELY.